Jan. 6, 1959  G. P. JANKAUSKAS  2,867,299
ANTI-SKID BRAKE MECHANISM
Filed May 26, 1954  4 Sheets-Sheet 1

INVENTOR.
George Platon Jankauskas
BY Rennie, Edmonds,
Morton, Barrows & Taylor
ATTORNEYS Jan. 6, 1959 G. P. JANKAUSKAS 2,867,299
ANTI-SKID BRAKE MECHANISM
Filed May 26, 1954 4 Sheets-Sheet 2

INVENTOR.
George Platon Jankauskas
BY
ATTORNEYS

Jan. 6, 1959    G. P. JANKAUSKAS    2,867,299
ANTI-SKID BRAKE MECHANISM
Filed May 26, 1954    4 Sheets-Sheet 3
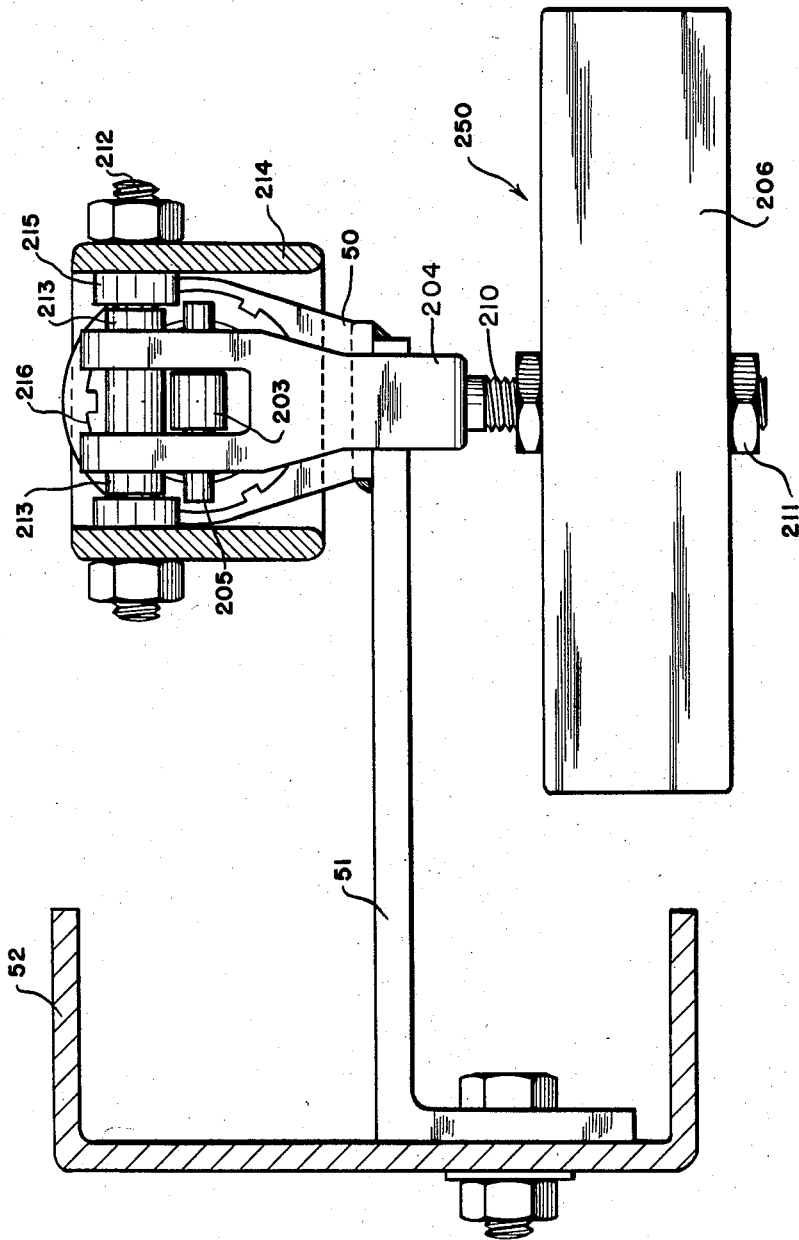
INVENTOR.
George Platon Jankauskas
BY
ATTORNEYS

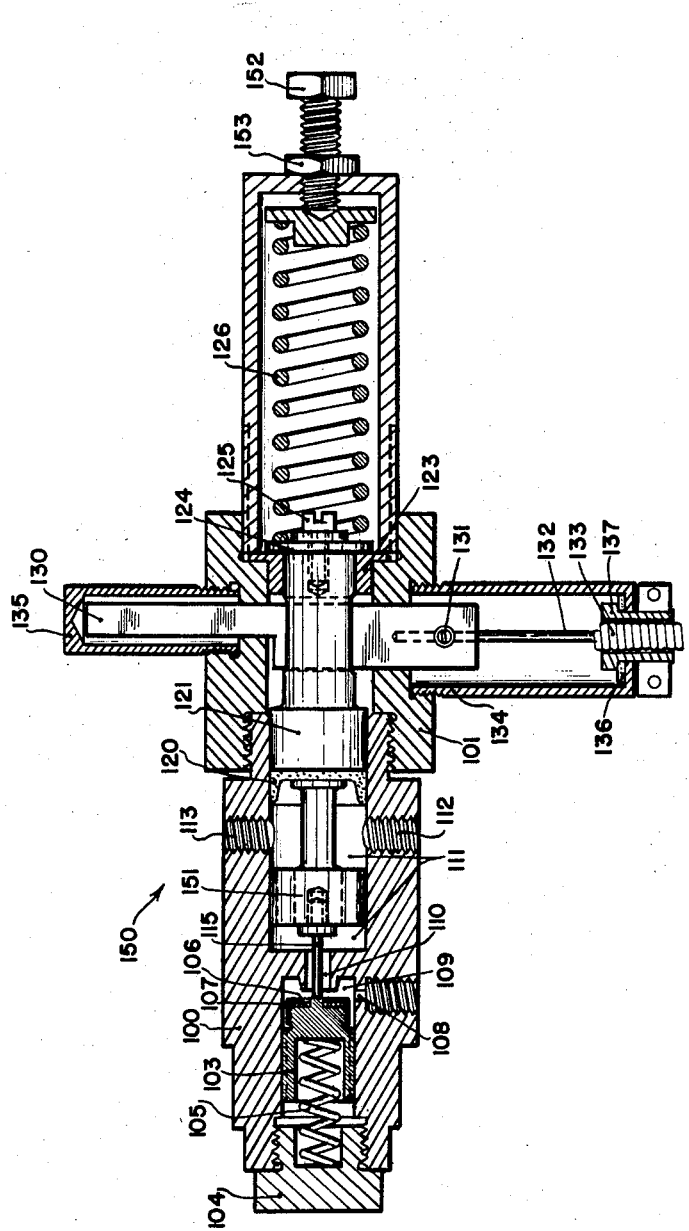

United States Patent Office 2,867,299
Patented Jan. 6, 1959

2,867,299

ANTI-SKID BRAKE MECHANISM

George Platon Jankauskas, New York, N. Y., assignor to Walter A. Dubovick, Fords, and John P. Kozak and Paul A. Kozak, South River, N. J.

Application May 26, 1954, Serial No. 432,525

4 Claims. (Cl. 188—152)

This invention relates generally to an anti-skid brake device for use in the braking systems of wheeled vehicles and more particularly to a device wherein the braking force exerted on the rear wheels of a vehicle having a hydraulic braking system is made dependent upon the braking effect on the vehicle by the front wheels on the road.

As I have pointed out in my co-pending applications, Serial No. 332,064, filed January 19, 1953, which issued September 24, 1957, as Patent No. 2,807,338, entitled "Anti-Skid Braking Systems for Automotive Vehicles" and Serial No. 409,051, filed February 9, 1954, entitled "Anti-Skid Braking Mechanism," now abandoned, cars equipped with normal hydraulic braking systems wherein the hydraulic pressure exerted in the brake cylinders is for both the front and rear wheels a direct function of pedal pressure over the entire range of possible pedal pressures, are very apt to skid on wet and slippery roads.

The primary reason for skid when a vehicle is braked is the loss of effective braking at the instant of rear wheel lock. Hence, if rear wheel lock can be prevented, skidding is minimized. A contributing complexity arises because, when braking force is exerted, the rear end of a vehicle tends to rise thus throwing additional weight on the front wheels while unburdening the rear wheels. This in turn helps the rear wheels to lock as the adhesion between wheels and road is directly proportional to the weight or force normal to the road at any particular wheel in question.

It is well known that a skidding wheel has less adhesion to a road and thus is capable of less braking effect on a vehicle than a turning wheel so that there is an abrupt reduction in braking force exerted when the rear wheels are first locked. Such loss of braking force sends the rear wheels into a skid. It is therefore an object of this invention to provide means for preventing the rear braked wheels of a vehicle from locking upon sudden application of the brake pedal under all road conditions.

It is a further object of the invention to provide automatic means whereby the braking force applied to the rear braked wheels of a vehicle is made dependent upon the braking effect actually exerted on the vehicle by its front braked wheels, but is kept below the locking point.

Still another object of the invention is to provide a device which may be inserted in the hydraulic lines leading from the master cylinder to the braked rear wheel cylinders of any vehicle having a hydraulic braking system which will accomplish the foregoing objects by varying the pressure exerted on the braked rear wheel cylinders independent of the pressure exerted on the front braked wheel cylinders by the master cylinder.

I propose to accomplish these various objects by inserting in the hydraulic system of a wheeled vehicle a control valve in the hydraulic lines leading from the master cylinder to the braked rear wheel cylinders. This control valve comprises a piston controlled, spring-loaded check valve which when open permits flow of hydraulic fluid from the master cylinder to the braked rear wheel cylinders and when closed shuts off such flow. The check valve is spring-loaded to be normally open, but arranged to close through action of a control piston at a predetermined pressure. The control piston, movable back and forth in a control cylinder, is attached to a needle which in turn holds the check valve open. The control piston is engaged on one side by a counter spring which pushes the piston one way in the control cylinder while the fluid pressure from the master cylinder opposes the spring to push the piston the other way in the control cylinder. This counter spring is pre-set so that the check valve will close at a predetermined pressure. This predetermined pressure is the maximum which can be applied to the rear braked wheel cylinders without having the wheels lock on an icy road. Associated with the control valve is an inertia-operated piston movable in a cylinder in communication with the hydraulic lines running from the control valve to the braked rear wheel cylinders. This inertia-operated piston may in one form of the invention, be the control piston in the control cylinder, or in another form of the invention may be a separate piston in a separate cylinder in communication with the braked rear wheel cylinder. Where the inertia piston is the same as the control piston, an inertia-operated plunger is provided for engaging the control piston to move it against the fluid pressure in the control cylinder. The plunger in turn is associated with a pendulum consisting of a weight eccentrically mounted on an arm which is spring or rubber biased so that the arm rests in a predetermined position when the vehicle is neither accelerating nor decelerating. Key means are provided for locking the control piston against movement so that when the vehicle is on a dry road, hydraulic pressure exerted on the front braked wheels will be equal to the hydraulic pressure exerted on the rear braked wheels. The key means are connected by a flexible cable to the dashboard of the vehicle so that the key may readily lock and unlock the control piston.

In the drawings in which like numerals denote like parts:

Fig. 3 is an end view of Fig. 2 taken along line 3—3 of Fig. 2;

Fig. 5 is a detailed cross-sectional view of the control valve as used in the hydraulic braking system of Fig. 4;

In a conventional hydraulic braking system for wheeled vehicles, a hydraulic master cylinder is connected by hydraulic lines directly to both the braked front and braked rear wheel cylinders. When the brake pedal is depressed, the pressure exerted on the brake cylinders in such a conventional system will be equal, as all cylinders are connected directly to the master cylinder. When there is a sudden application of the brake pedal, the rear wheels will lock or skid before the front wheels. This is because, as was pointed out earlier, the weight of the vehicle effectively shifts forward upon deceleration and so throws more weight upon the front wheels than upon the rear wheels.

Figure 1:
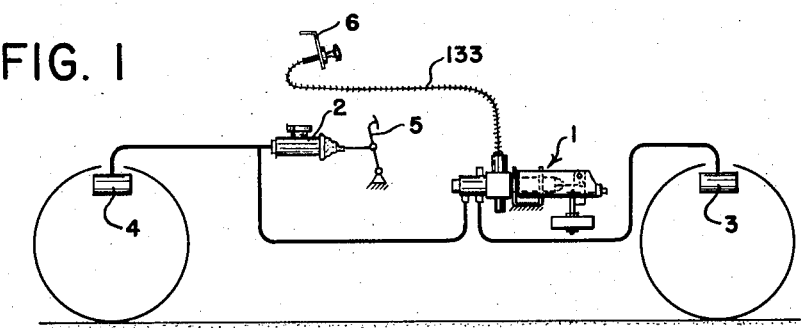
Fig. 1 is a diagrammatic view of a hydraulic braking system of a wheeled vehicle showing the location of my anti-skid device in relation to the master brake cylinder and the braked wheel cylinders.

In order to prevent the rear wheels from locking upon sudden application of the brake pedal, I insert a device 1, in the hydraulic braking system of a vehicle as shown in Fig. 1, between the master brake cylinder 2 having a master piston slidable therein and the rear wheel brake cylinders 3 so that the hydraulic pressure to the rear wheel cylinders is effectively reduced to a point where the rear wheels will turn instead of lock on an icy road. The master cylinder 2 is also connected by hydraulic lines to front braked wheel cylinder 4 and is actuated by pedal 5.

Figure 2:
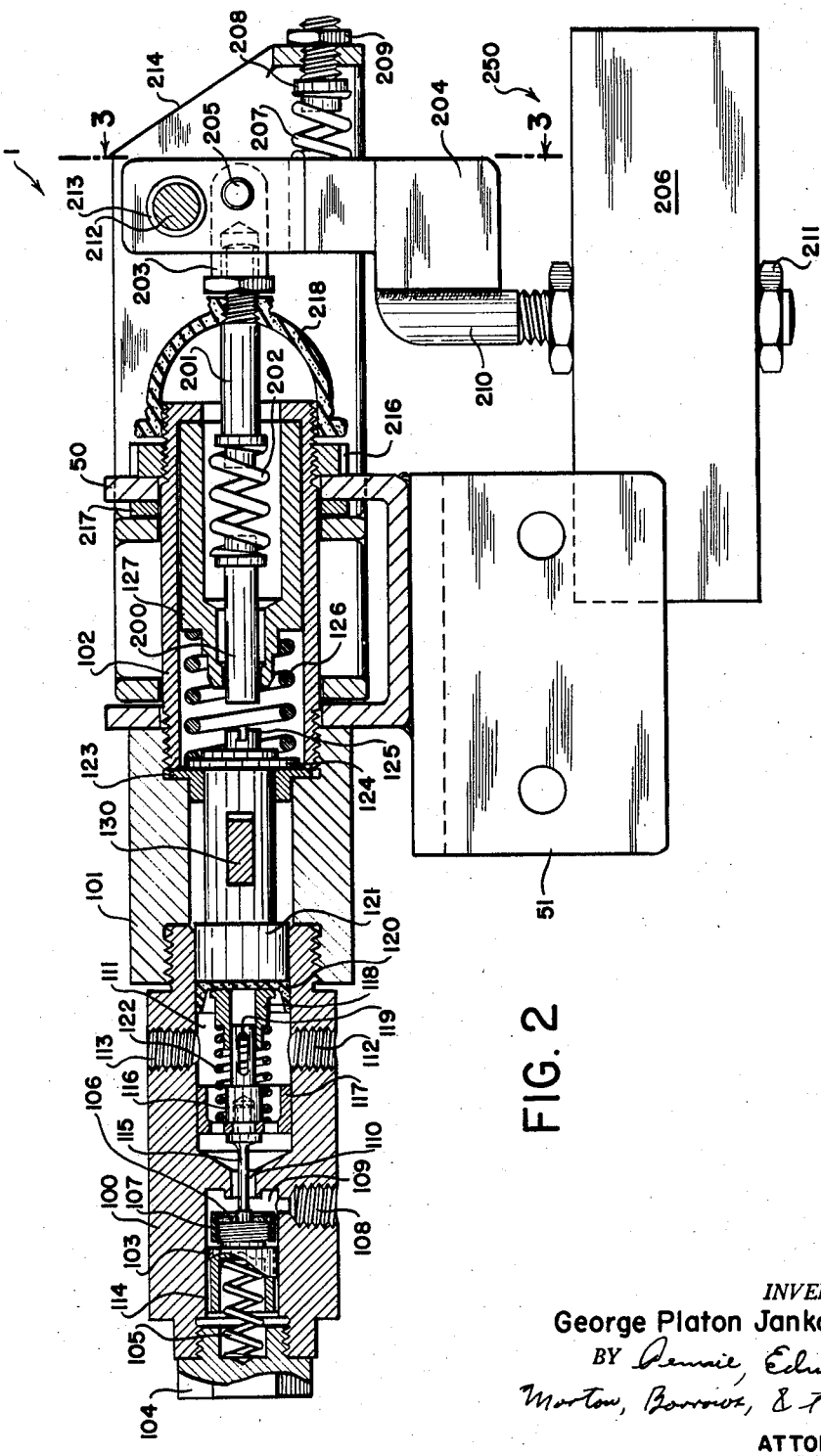
Fig. 2 is a detailed cross-sectional view of the anti-skid device as used in Fig. 1.

Referring to Fig. 2 which shows in detail the device as used in the hydraulic system of Fig. 1, it is seen that the valve casing 100 is screwed to member 101 which in turn is screwed to pipe nipple 102. Pipe nipple 102 is carried by bracket 50 which is welded to an angle iron bracket 51. Angle iron bracket 51 is bolted to the vehicle frame 52 and supports the complete device. The check valve 103 which serves to prevent flow of fluid from the master cylinder to the braked rear wheel cylinders is carried in valve casing 100. A plug 104 is provided at one end of the casing so that the check valve 103 and retaining spring 105 may be inserted in the casing. The check valve 103 consists of a rubber gasket or washer 106 held in place by cup 107 in order to give a fluid tight seal when the valve is in the closed position. Threaded passage 108 in casing 100 connects with the hydraulic line leading from the master brake cylinder and opens into chamber 109 of the valve assembly. Chamber 109 is in communication with control chamber 111 by means of a smaller passage 110. Control chamber 111 connects with threaded passage 112 which provides a connection for the hydraulic lines leading to the braked rear wheel cylinders. It is thus seen that when check valve 103 is in the opened position, passages and chambers 108 through 112 are in communication with each other so that the hydraulic pressure in the master brake cylinder will equal the hydraulic pressure in the braked rear wheel cylinders. An outlet 113 is provided in casing 100 in order to provide for an air bleeder valve for chamber or control cylinder 111.

Check valve 103 is free to slide in chamber 109 under the influence of spring 105 and needle 115. Grooves 114 are provided in the valve so that there will be a hydraulic passage from the front of the valve to the rear of the valve. Needle 115 is screwed into stem 116 which is held in the center of passageway 110 by perforated piston 117. The stem 116 is held to seat 118 by means of pin 119. Seat 118 in turn engages piston seal 120 and forces it to rest on control piston 121. A separating spring 122 is provided so as to continually force stem 116 and seat 118 apart. This spring is much stronger than spring 105 which forces the check valve to the closed position so that spring 105 will not effect the deflection of spring 122. The purpose of spring 122 is to allow back movement of control piston 121 when check valve 103 is in the closed position and loaded with high pressure from the master brake cylinder.

As most clearly seen in Fig. 5, control piston 121 can be locked against movement by means of a key 130 which is connected by set screw 131 to a flexible cable 132 which is carried by a flexible conduit 133. The free end of cable 132 can be placed in any convenient position, such as on the dashboard 6 of an automobile as shown in Fig. 1, so that the piston 121 may be locked or unlocked at any time by the operator of the vehicle. Covers 134 and 135 are provided along with seal 136 and sleeve 137 so that the locking system will be dust proof. It is thus seen that when the piston is in the locked position, as shown in Figs. 2 and 5, the check valve 103 will be continually held open by needle 115 so that the hydraulic pressure exerted on the rear wheel brake cylinders or motors by the master cylinder will be substantially equal to that exerted on the braked front wheel cylinders.

The end of control piston 121 opposite the check valve is guided by sleeve 123 which is held by member 101. Spring seat washer 124 is bolted to piston 121 by bolt 125 and engages one end of a counter spring 126. Counter spring 126 is adjusted by means of a calibrated sleeve 127 for icy road conditions so that when key 130 is pulled out to unlock piston 121, a predetermined fluid pressure acting on piston 121 will cause it to move against spring 126 and so allow check valve 103 to close under influence of spring 105. The result of the check valve closing is effectively to cut off communication of the braked rear wheel cylinders with the master brake cylinder so that increase of hydraulic pressure in the master brake cylinder will have no effect on the braked rear wheel cylinders. The pressure at which the check valve will close is set by the spring 126 to be the maximum pressure that can be exerted on the rear wheel brakes before they will lock on an icy road.

When the vehicle is braked on a wet surface, a greater braking force may be applied to the braked rear wheels before they lock than on an icy surface. This is because the adhesion of wheels to wet roads is much higher than the adhesion of wheels to icy roads. Instead of providing manual means for changing the strength of spring 126 in order to vary the pressure to the braked rear wheel cylinders as was done in my Patent No. 2,807,338, I provide an inertia-operated plunger 200 which will force piston 121 towards needle 115 to effectively increase the pressure in chamber 111 and so increase the pressure in the braked rear wheel cylinders.

As seen in Fig. 2, the inertia plunger 200 is connected to stem 201 by spring 202 which serves to cushion the striking of the plunger 200 on bolt 125. The stem 201 is adjustably screwed into link 203 which is mounted on a perpendicular arm 204 by pin 205. As the vehicle decelerates the pendulum, denoted generally by the numeral 250, will swing forward causing the plunger 200 to strike bolt 125 and thus increase pressure in the chamber 111 if the check valve 103 remains closed. The weight 206 is mounted eccentrically on perpendicular arm 204 so that the position of the pendulum remains substantially the same when the vehicle is on a normal down-hill slope. This is because the force to the rear caused by the weight being mounted eccentrically on the arm is greater than the force to the front that would be caused by the maximum down-hill slope that the vehicle will be normally subjected to. The pendulum will swing forward whenever the maximum down-hill slope is exceeded, but there will be no increase of pressure in chamber 111 because the check valve 103 is open except when the brake pedal is depressed. A cushion in the form of a spring 207 is provided to hold the arm in a predetermined position when the car is neither accelerating nor decelerating. The predetermined position shown in the drawings is perpendicular to the direction of travel of the vehicle. The spring is press fitted on adjustable screw 208 which is then held in place by lock nut 209. Weight 206 is adjustably mounted on arm 210 of the perpendicular arm 204 by nut 211 so that the increase in pressure in chamber 111 caused by the swinging of the pendulum can be changed for different model vehicles. Thus, by lowering the weight, the perpendicular arm is effectively made longer so that upon a given rate of deceleration a greater force will be applied to piston 121 than when the weight is at a higher position upon the arm. In order to allow the pendulum to swing freely and not bind when the vehicle is swaying or rounding a curve, it is suspended from axle 212 which passes through a friction sleeve 213 carried on swinger 214. The pendulum is centered on axle 212 by space washers 215 as best seen in Fig. 3. The swinger 214 is freely suspended to swing or rotate on pipe nipple 102 which in turn is fastened in bracket 50 by lock nut 216 so that when the vehicle rounds a sharp curve, centrifugal force acting on the weight 206 will not bind the pendulum and prevent it from moving if the vehicle decelerates. Friction washer 217 provides a rest between the swinger 214 and bracket 50. A rubber cover 218 surrounds the stem 201 and end of pipe nipple 102 in order to give a dust proof connection between the parts.

In operation on dry roads, the locking key 130 is left engaged so that piston 121 is not allowed to move. When the operator depresses the brake pedal, he causes an increase in hydraulic pressure to be carried from the master cylinder to the braked front wheel cylinders and since valve 103 is kept open by needle 115, this same pressure will also be transmitted to the braked rear wheel cylinders. The effect is to cause a substantially equal pressure to be applied to all braked wheels.

When the road conditions become wet or icy, the operator unlocks key 130 so as to allow piston 121 to move in chamber 111 upon increase in hydraulic pressure from the master cylinder. On an icy road, when the operator depresses the brake pedal, he will cause an increase in hydraulic pressure to be transmitted from the master cylinder to the chamber 111. This increase in pressure will oppose counter spring 126 and thus move piston 121 towards the spring 126. Since needle 115 is connected to the piston, it will also move towards the counter spring. This will then allow spring 105 to close check valve 103 and prevent further pressure from being applied to the braked rear wheel cylinders from the master cylinder. The maximum deceleration obtainable on an icy road is relatively so slight that the change in inertia of pendulum 250 will have no effect on plunger 200.

If however, the road were not icy, but only wet, there would be a higher degree of adhesion between the braked front wheels and the roadway so that more hydraulic pressure could be applied to the braked front wheels before they locked. This in turn would increase the deceleration of the vehicle and cause the pendulum 250 to swing forward. Stem 201 would force plunger 200 into contact with piston 121 causing it to move to the left as seen in the drawings. Since the check valve is closed and held so by spring 105 and by the relatively greater pressure in chamber 109, movement of piston 121 to the left will increase the pressure in chamber 111. Since this chamber is in communication with the braked rear wheel cylinders, such increase in pressure will cause a greater braking effect to be exerted on the vehicle by the braked rear wheels. The amount of brake force that is then applied to the rear braked wheels thus depends directly upon the actual braking effect achieved by the front braked wheels and it might be said that the rear wheels "sense" the available road adhesion. This is because as the greater the braking effect of the front wheels on the vehicle, the greater force pendulum 250 will cause plunger 200 to bear on piston 121 and so increase pressure in the braked rear wheel cylinders.

It has been found by experiment that even when piston 121 is left unlocked when the vehicle is on a dry road, that almost the same total braking effect can be had as when the piston is locked. This is because of the relatively strong braking effect that the front wheels exert on the vehicle thus causing the pendulum 250 to swing violently forward to increase pressure in the chamber 111.

Figure 4:
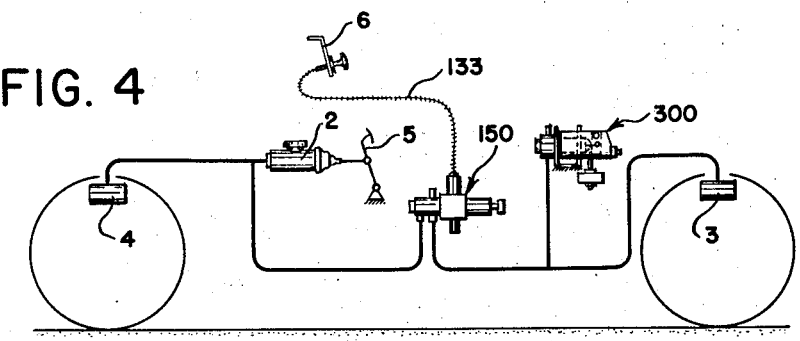
Fig. 4 is a diagrammatic view of a hydraulic braking system of a wheeled vehicle showing a different embodiment of my anti-skid device.
Figure 6:
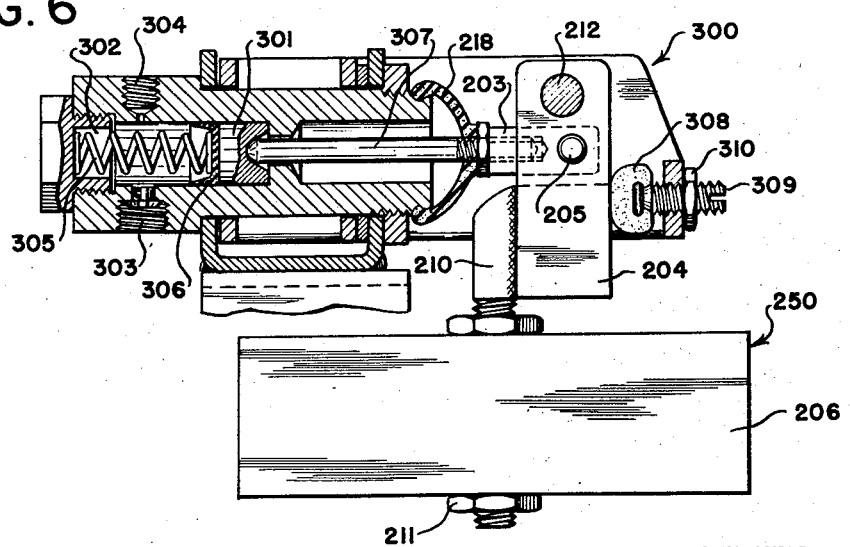
Fig. 6 is a detailed partial cross-sectional view of the inertia-operated piston as used in the hydraulic braking system of Fig. 4.

Another form of my invention is shown in Fig. 4 wherein the control valve 150 shown in detail in Fig. 5 is mounted in a hydraulic braking system of a wheeled vehicle separate from an inertia-operated braking booster 300, the detail of which is shown in Fig. 6. The same numerals are used in this form of the invention as that shown in Figs. 1–3 to denote like structure.

The structure of the control valve of Fig. 5 is similar to that shown in my co-pending application, Serial No. 332,064, except that I provide locking means for locking the piston 121 against movement. This control valve differs from that shown in Fig. 2 in that no spring means are provided to force needle 115 apart from piston seal 120. The needle 115 shown in this form of the invention is screwed to perforated piston 151 which serves as a guide for the needle and this piston rests directly on piston seal 120. In this form of the invention, I regulate the force of counter spring 126 by means of an adjusting nut 152 and lock screw 153 instead of by a calibrated sleeve, as shown in Fig. 2. I achieve the same braking effect on the vehicle as by the device shown in Figs. 1, 2 and 3 by combining this control valve in a hydraulic system as seen in Fig. 4, with a separate inertia-operated braking booster 300.

Referring to Fig. 6 which shows the braking booster 300 in detail, it is seen that the pendulum 250 operates a piston 301 slideable in a cylinder 302 to increase pressure in the booster cylinder when the vehicle decelerates. Cylinder 302 is connected to the hydraulic lines leading from the control valve 150 to the rear braked wheel cylinders by threaded passage 303. Passage 304 is provided at the top of the cylinder for the insertion of an air bleeder valve. A return spring 305 operates to return the piston seal 306 and piston 301 to their normal positions after they have been moved by stem 307 when pendulum 250 swings forward.

The construction and mounting of pendulum 250 is similar to that shown in Figs. 2 and 3, except that instead of a spring for keeping the pendulum in a predetermined position, a rubber cushion 308 is provided which is adjustable by nut 309 and lock screw 310.

The operation of this form of the invention is the same as for that shown in Figs. 1 through 3. Counter spring 126 is pre-set by adjusting screw 152 and lock nut 153 so that the check valve 103 will close upon a predetermined fluid pressure acting on piston 121. This pressure is set low enough so that the rear braked wheels will never lock on an icy road. Upon wet roads however, the braking effect on the vehicle of the front braked wheels will be greater so that a more rapid deceleration will result in pendulum 250 forcing piston 301 to move in cylinder 302 to increase the pressure in the hydraulic lines leading to the rear braked cylinders. This action automatically increases the braking effect on the vehicle by the rear braked wheels. The advantage of this embodiment of the invention is that the control valve and inertia-operated piston may be separated and located where most convenient. Thus the control valve could be located on the dashboard of a vehicle while the pendulum-operated piston could be located near the braked rear wheel cylinders.

I claim:

1. In a hydraulic braking system of a wheeled vehicle having a braked wheel on at least one front and one rear axle: a wheel cylinder and a wheel piston in said wheel cylinder for each braked wheel; a master cylinder and a master piston in said master cylinder; brake lines connecting said master cylinder to said wheel cylinders; hydraulic fluid in said cylinders and lines; means for actuating said master piston to increase fluid pressure in said master cylinder; a pressure operated variable control valve assembly interposed in the brake lines extending from said master cylinder to the wheel cylinders associated with the rear braked wheels, said valve assembly having a high pressure chamber connected to the brake line leading from said master cylinder, a low pressure chamber connected to the brake lines leading to each cylinder associated with a rear braked wheel and hydraulic pressure limiting means including a valve, a control member movable in response to and having only a single face exposed to the pressure in said low pressure chamber for seating said valve in response to a predetermined high pressure in said low pressure chamber, and a regulatable resilient loading means opposing said action of said control member on said valve to unseat said valve at pressure lower than said predetermined high pressure whereby the fluid pressure applied to said rear wheel cylinders is not affected by the rate of actuation of said master piston above said predetermined high pressure and the maximum fluid pressure that can be applied to said rear wheel cylinders, regardless of the force exerted on said master piston, will not exceed said predetermined high; and inertia means depending upon deceleration of said vehicle for increasing pressure in said rear wheel cylinders above said predetermined high pressure in said low pressure chamber.

2. In a hydraulic braking system of a wheeled vehicle having a braked wheel on at least one front and one rear axle: a wheel cylinder, and a wheel piston in each said wheel cylinder, for each braked wheel; a master cylinder and a master piston in said master cylinder; and inertia responsive means for increasing pressure in the cylinders associated with each rear braked wheel above that exerted by said master piston, comprising a pressure chamber in the brake lines leading from said master cylinder to said rear wheel cylinders, a spring biased piston slidable in said chamber and the spring of which biases said piston outwardly of said chamber, a plunger outside said chamber contacting said piston to move it inwardly of said chamber, an arm pivoted at one end about a point and having an eccentrically mounted mass on its other end, said plunger being connected to said arm, and a positioning spring bearing against said arm to keep said arm substantially perpendicular to the travel of said vehicle when said vehicle is neither accelerating nor decelerating.

3. In a fluid pressure brake system for a wheeled vehicle having front braked wheels on at least one front axle and rear braked wheels on at least one rear axle: fluid pressure operated braking motors for each braked wheel; a master cylinder; means for increasing fluid pressure in said master cylinder; conduits for transmitting fluid under pressure from said master cylinder to said motors; a spring loaded check valve, the check spring of which biases said valve to a closed position, said check valve being located in said conduits between said master cylinder and the motors associated with the rear braked wheels; a control chamber in communication with the rear wheel motors; a control piston in said control chamber; a first plunger in said control chamber bearing on said check valve; a separating spring stronger than said check spring biasing said first plunger away from said control piston; a counter spring stronger than said separating spring biasing said control piston towards said first plunger to hold said check valve open when pressure in said control chamber is insufficient to move said control piston against the bias of said counter spring; a second plunger adapted to engage said control piston to move it towards said check valve against the bias of said separating spring; and an inertia element adapted to engage said second plunger upon deceleration of said vehicle to move said control piston against the bias of said separating spring and to increase pressure to the rear wheel motors when said check valve is closed; said check valve being closed when pressure in said control chamber reaches the set pressure of said counter spring and causes said control piston to move away from said check valve to allow said check valve to close under the force of said check spring.

4. A braking system according to claim 1 having in addition inertia spring means and in which said inertia element is a pendulum comprising a mass eccentrically mounted on one end of an arm, the other end of which is adapted to pivot about a point; said inertia spring means bearing against said arm to keep it substantially perpendicular to the travel of said vehicle when said vehicle is neither accelerating nor decelerating.

References Cited in the file of this patent

UNITED STATES PATENTS

| | | |
|---|---|---|
| 1,460,164 | Loughead | June 26, 1923 |
| 2,073,163 | Martin | Mar. 9, 1937 |
| 2,115,071 | Hunt | Apr. 26, 1938 |
| 2,218,194 | Freeman | Oct. 15, 1940 |
| 2,241,191 | Freeman | May 6, 1941 |
| 2,242,297 | Freeman | May 20, 1941 |
| 2,367,115 | Goepfrich | Jan. 9, 1945 |
| 2,479,232 | Gunderson | Aug. 16, 1949 |
| 2,636,349 | Schnell | Apr. 28, 1953 |

UNITED STATES PATENT OFFICE

CERTIFICATE OF CORRECTION

Patent No. 2,867,299 January 6, 1959

George Platon Jankauskas

It is hereby certified that error appears in the above numbered patent requiring correction and that the said Letters Patent should read as corrected below.

In the grant, lines 2 and 3, for "assignor to Walter A. Dubovick, of Fords, and John P. Kozak and Paul A. Kozak, of South River, New Jersey," read -- assignor, by direct and mesne assignments, of one-third to Walter A. Dubovick, of Fords, and two-thirds to John P. Kozak, of South River, New Jersey, --; lines 12 and 13, for "Walter A. Dubovick, John P. Kozak, and Paul A. Kozak, their heirs" read -- Walter A. Dubovick and John P. Kozak, their heirs --; in the heading to the printed specification, lines 3, 4 and 5, for "assignor to Walter A. Dubovick, Fords, and John P. Kozak and Paul A. Kozak, South River, N. J." read -- assignor, by direct and mesne assignments, of one-third to Walter A. Dubovick, Fords, and two-thirds to John P. Kozak, South River, N. J. --.

Signed and sealed this 4th day of August 1959.

(SEAL)
Attest:

KARL H. AXLINE

Attesting Officer

ROBERT C. WATSON

Commissioner of Patents